United States Patent Office 2,747,005
Patented May 22, 1956

2,747,005

VULCANIZATION OF RUBBER AND COMPOSITIONS EMPLOYED THEREFOR

Richard O. Zerbe, Nitro, and Monte C. Throdahl, St. Albans, W. Va., assignors to Monsanto Chemical Company, St. Louis, Mo., a corporation of Delaware No Drawing. Application November 14, 1951, Serial No. 256,364

16 Claims. (Cl. 260—763)

This invention relates to new and useful compositions of matter obtained by heating a 2,2'-dithiobisthiazole with an N-thio secondary amine. In addition this invention relates to the vulcanization of rubber, particularly those rubbers compounded with a reinforcing furnace carbon black, and to the vulcanizates obtained employing the new compositions.

The 2,2'-dithiobisthiazoles are valuable accelerators of vulcanization and ordinarily impart considerable processing safety but are deficient in this respect when employed in conjunction with reinforcing furnace carbon blacks. Furthermore the 2,2'-dithiobisarylenethiazoles are high melting powders difficult to incorporate into rubber. The N-thio secondary amines are efficient vulcanizing agents and also possess accelerating properties but their activity usually must be supplemented by the addition of sulfur and other accelerating components.

It is an object of the invention to provide improved vulcanizing and accelerating compositions. A further object is to provide vulcanizing and accelerating compositions which possess ample processing safety especially in stocks containing reinforcing furnace carbon black. A still further object is to provide compositions which disperse rapidly and uniformly into rubber. A further particular object is to provide compositions which possess in combination vulcanizing and accelerating properties which do not have to be supplemented by other ingredients. Other objects will in part be apparent and in part particularly pointed out in the description following.

In accordance with this invention it has been found that these and other objects are achieved by heating an N-thio secondary amine with a 2,2'-dithiobisthiazole. The compositions possess properties and advantages not possessed by the starting materials although the changes which take place on heating are unknown. In contrast to the 2,2'-dithiobisthiazoles they are soluble in most organic solvents and are characterized by ease of incorporation and good solubility in the various sulfur vulcanizable rubbers. Contrary to expectation heating the 2,2'-dithiobisthiazole with an N-thio secondary amine increases the processing safety of vulcanizable rubber stocks while at curing temperature the composite fusion products exhibit powerful accelerating and vulcanizing activity.

By 2,2'-dithiobisthiazoles is meant compounds such as the 2,2'-dithio-bis-(arylenethiazoles), the 2,2'-dithio-bis-(thiazoles), the 2,2'-dithio-bis-(thiazolines) or bis-(dihydrothiazoles) and their various alkyl, cycloalkyl, aralkyl, aryl and alkaryl substituted analogues and homologues. Preferred are the 2,2'-dithio-bis-(arylenethiazoles) and their substituted analogues and homologues.

Suitable N-thio secondary amines are compounds of the general formula $$RR_1N—S_x—NR_1R$$

where $x$ is a whole number, where the radical $RR_1N$ is derived from an amine which is non-aromatic in nature.

For example, R and $R_1$ may be like or unlike alkyl groups, substituted alkyl groups, alicyclic groups, aralkyl groups, or the radical —$NR_1R$ may be a saturated heterocyclic group in which $RR_1$ is alkylene, alkylene-oxy-alkylene or alkylene-thio-alkylene. The preferred N-thio secondary amines are the disulfides, particularly the disulfides of morpholine, 1,4-thiazone, piperidine, the pipecolines, and like six-membered heterocyclic amino compounds.

Typical examples of suitable N-thio secondary amines are N,N'-dithio-bis-(dimethylamine), N,N'-dithio-bis-(diethylamine), N,N'-dithio-bis-(dipropylamine), N,N'-dithio-bis-(diisopropylamine), N,N'-dithio-bis-(dibutylamine), N,N'-dithio-bis-(diisobutylamine), N,N'-dithio-bis-(diamylamine), N,N'-dithio - bis - (dihexylamine), N,N'-dithio-bis-(diheptylamine), N,N'-dithio-bis-(dioctylamine), N,N'-dithio-bis-(didecylamine), and N,N'-dithio-bis-(didodecylamine). Still further examples are N,N'-dithio-bis-(dicyclohexylamine), N,N'-dithio-bis-(ditetrahydrofurylamine), N,N'-dithio-bis-(ditetrathienylamine), N,N'-dithio-bis-(di-β-cyanoethylamine), N,N'-dithio-bis-(di-β-chloroethylamine), N,N'-dithio-bis-(di-β-phenethylamine), N,N'-dithio-bis-(dibenzylamine), N,N'-dithio-bis-(ditetrahydrofurfurylamine), N,N'-dithio-bis-(ditetrahydrothenylamine), N,N'-dithio-bis-(N-methylcyclohexylamine), N,N'-dithio-bis-(N-ethylcyclohexylamine), N,N'-dithio-bis-(N-isopropylcyclohexylamine), N,N'-dithio - bis-(methylaminoacetonitrile), N,N'-dithio-bis-(ethylaminoacetonitrile), N,N'-dithio-bis-(propylaminoacetonitrile), N,N'-dithio-bis-(butylaminoacetonitrile), N,N'-dithio-bis-(methylaminopropionitrile), N,N'-dithio-bis - (ethylaminopropionitrile), N,N' - dithio - bis-(isopropylaminopropionitrile), N,N' - dithio - bis-(butylaminopropionitrile), N,N'-dithio-bis-(amylaminopropionitrile), N,N'-dithio-bis-(octylaminopropionitrile), N,N'-dithio-bis-(octadecylaminopropionitrile), N,N'-dithio-bis-(N-methyltetrahydrofurfurylamine), N,N'-dithio-bis-(N-ethyltetrahydrofurfurylamine), N,N'-dithio-bis-(isopropyltetrahydrofurfurylamine), N,N'-dithio-bis-(N-isobutyltetrahydrofurfurylamine), N,N'-dithio-bis-(N-cyclohexyltetrahydrofurfurylamine), N,N'-dithio-bis-(N-cyclohexyltetrahydrothenylamine), N,N' - dithio-bis-(cyclohexylaminoacetonitrile), N,N'-dithio - bis-(cyclohexylaminopropionitrile), N,N'-dithio-bis-(tetrahydrofurylaminopropionitrile), N,N'-dithio-bis-(piperidine), N,N'-dithio-bis-(α pipecoline), N,N'-dithio-bis-(morpholine), N,N'-thio-bis-(morpholine), N,N'-thio-bis-(dimethylamine), N,N'-thio-bis-(diethylamine), N,N'-thio-bis-(dipropylamine), N,N'-thio-bis-(diisopropylamine), N,N'-thio-bis-(dibutylamine), N,N'-thio-bis-(dicyclohexylamine), N,N'-thio-bis-(dibenzylamine), N,N'-thio-bis-(N-methylcyclohexylamine), N,N'-thio-bis-(propylaminoacetonitrile), N,N'-thio-bis-(butylaminoacetonitrile), N,N'-thio-bis-(methylaminopropionitrile), N,N'-thio-bis-(ethylaminopropionitrile), N,N' - thio - bis-(isopropylaminopropionitrile), N,N'-thio-bis-(butylaminopropionitrile), N,N' - thio-bis-(amylaminopropionitrile), N,N'-thio-bis-(N-methyltetrahydrofurfurylamine), N,N'-thio-bis-(N-ethyltetrahydrofurfurylamine), N,N'-thio-bis-(N-isopropyltetrahydrofurfurylamine), N,N'-thio-bis-(N-isobutyltetrahydrofurfurylamine), N,N'-thio-bis-(N-cyclohexyltetrahydrofurfurylamine), N,N' - thio - bis - (cyclohexylaminoacetonitrile), N,N'-thio - bis-(cyclohexylaminopropionitrile), N,N'-thio-bis-(tetrahydrofurylaminopropionitrile), N,N'-thio-bis-(piperidine) and N,N'-thio-bis-(α pipecoline).

The term "reinforcing furnace black" is a well known expression in the rubber trade and by definition means furnace blacks which are more reinforcing than mere diluents and includes the products commonly known as semi-reinforcing furnace blacks, as for example Pelletex, as well as those having greater reinforcing properties.

These latter which may be called high reinforcing furnace blacks are variously referred to in the trade as fine furnace black, high modulus furnace black, medium abrasion furnace black, high abrasion furnace black and reinforcing furnace black. They are known under a variety of trade names, some of which are Sterling L, Sterling 80, Sterling 105, Philblack O, Philblack A, Statex K, Statex R, Statex 93, Kosmos 60, Vulcan–1, Vulcan–3, Continex HMF, Modulex, and Aromex. The furnace blacks are characterized by the propertry of activating the cure in contrast to the channel blacks which retard cure. While it is next to impossible to scorch or prevulcanize a pure gum stock compounded with N-cycloxheyl-2-benzothiazole sulfanamide accelerator at 250° F., the addition to a gum base stock carrying 0.5 part by weight of this accelerator and 2.5 parts by weight sulfur on the rubber of 20 parts by weight of a high reinforcing furnace black gives a stock having a decided tendency to scorch considerably below curing temperature. Increasing the proportion of the furnace black increases the tendency to scorch. In general 20–80 parts by weight on the rubber of furnace black cover the usual compounding practice but even lower proportions induce definite scorching tendencies.

The new compositions of this invention are of an unknown nature and this invention is not limited to any theory as to the presence or absence of chemical modifications of the respective sulfides but pertains broadly to the composition obtained upon heating a thiazyl sulfide with an N-thio secondary amine.

The new compositions of this invention can be prepared by a variety of methods. For example, the respective sulfides may be preliminarily mixed and then heated, or either sulfide may be added to the other which is maintained in a suitably heated liquid state.

The following is illustrative of the new compositions of this invention and their preparation:

EXAMPLE 1

Into a suitable reaction vessel is added 236 parts by weight (substantially 1 mole) of N,N'-dithio-bis-(morpholine), M. P. 124–125° C. The sulfide is then melted, and while maintaining the temperature at about 125–130° C., 332 parts by weight (substantially 1 mole) of 2,2'-dithio-bis-(benzothiazole) is slowly added with agitation. Upon cooling the melt a pale yellow crystalline solid melting at 120–124° C. is obtained. The product is very soluble in hot ethyl acetate, chloroform, hot benzene, hot acetone, hot alcohol and hot heptane but insoluble in ether. N,N'-dithio-bis-(moropholine) is soluble in ether.

EXAMPLE 2

Into a suitable reaction vessel is added 300 parts by weight (substantially 1 mole) of N,N'-tetrathio-bis-(morpholine), M. P. 100–107° C. The sulfide is then melted, and while maintaining the temperature at about 120–130° C., 332 parts by weight (substantially 1 mole) of 2,2'-dithio-bis-(benzothiazole) is slowly added with agitation. Upon cooling the melt a tan resinous solid possessing a melting range of 85–95° C. is obtained.

EXAMPLE 3

Into a suitable reaction vessel is added 57.2 parts by weight (substantially 0.2 mole) of N,N'-dithio-bis-(β-isopropylaminopropionitrile). The sulfide is then heated, and while maintaining the temperature at 120–125° C., 66.4 parts by weight (substantially 0.2 mole) of 2,2'-dithio-bis-(benzothiazole) is slowly added with agitation. Upon cooling the melt a dark brown tar containing a small proportion of solids dispersed therein is obtained.

Other highly useful compositions exhibiting the properties of the products of this invention are obtained by suitably mixing and heating equimolecular proportions of the following thiazyl sulfides and N-thio secondary amines:

| Thiazyl sulfide | N-Thio secondary amine |
| --- | --- |
| 2,2'-dithio-bis-(dihydrothiazole) | N,N'-dithio-bis-(morpholine). |
| Do | N,N'-tetrathio-bis-(morpholine). |
| 2,2'-dithio-bis-(4,5-dimethyldihydrothiazole) | N,N'-trithio-bis-(morpholine). |
| 2,2'-dithio-bis-(4-ethylthiazole) | N,N'-dithio-bis-(morpholine). |
| 2,2'-dithio-bis-(4-phenylthiazole) | Do. |
| 2,2'-dithio-bis-(4-cyclohexylthiazole) | Do. |
| 2,2'-dithio-bis-(4,5-dimethylthiazole) | Do. |
| 2,2'-dithio-bis-(benzothiazole) | N,N'-dithio-bis-(diisopropylamine). |
| Do | N,N'-dithio-bis-(dibutylamine). |
| Do | N,N'-dithio-bis-(dicyclohexylamine). |
| Do | N,N'-dithio-bis-(N-methylcyclohexylamine). |
| Do | N,N'-dithio-bis-(β-n-butylaminopropionitrile). |
| Do | Do. |
| 2,2'-dithio-bis-(6-phenylbenzothiazole) | N,N'-dithio-bis-(β-cyclohexylaminopropionitrile). |
| 2,2'-dithio-bis-(6-methylbenzothiazole) | N,N'-dithio-bis-(β-tert. octyl aminopropionitrile). |
| 2,2'-dithio-bis-(naphthothiazole) | N-N'-dithio-bis-(morpholine). |
| Do | N,N'-dithio-bis-(piperidine). |
| Do | N,N'-dithio-bis-(α-pipecoline). |
| 2,2'-dithio-bis-(benzothiazole) | N,N'-monothio-bis-(morpholine). |

To demonstrate the utility and certain properties of the new compositions of this invention as compared to the component parts thereof the following rubber tire tread stocks are compounded in the usual manner:

| Stock | A | B | C | D | E | F |
| --- | --- | --- | --- | --- | --- | --- |
| Smoked sheets rubber parts by weight | 100 | 100 | 100 | 100 | 100 | 100 |
| Reinforcing furnace black do | 50 | 50 | 50 | 50 | 50 | 50 |
| Zinc oxide do | 5 | 5 | 5 | 5 | 5 | 5 |
| Saturated hydrocarbon oil softener parts by weight | 3 | 3 | 3 | 3 | 3 | 3 |
| Stearic acid do | 2 | 2 | 2 | 2 | 2 | 2 |
| p-Amino biphenyl-acetone reaction product parts by weight | 1.5 | 1.5 | 1.5 | 1.5 | 1.5 | 1.5 |
| Sulfur do | 0.8 | 0.8 | | | | |
| N,N'-dithio-bis-(morpholine) do | | 1.2 | | 1.2 | | 1.5 |
| 2,2'-Dithio-bis-(benzothiazole) do | | 1.6 | | 1.6 | | 2.0 |
| Product of Example 1 do | 2.8 | | 2.8 | | 3.5 | |

The processing safety of the respective compounded uncured stocks is determined by heating at 275° F. and measuring the plasticity by means of a Mooney plastometer employing the large rotor after various heating times in minutes. The scorch time is taken as the inflection point on the plasticity curve or in other words the point at which the plasticity begins to rise continuously with each reading:

Stock:                                  Scorch time, mins.
A ---------------------------------------- 8
B ---------------------------------------- 6
C ---------------------------------------- 13
D ---------------------------------------- 10
E ---------------------------------------- 14
F ---------------------------------------- 9

On the other hand the stocks containing the fusion product vulcanize rapidly at curing temperatures, producing vulcanizates having at full cure modulus and tensile properties somewhat higher than those attainable from the separate component. Vulcanization was effected in the usual manner by heating in a press at 291° F.

*Table 1*

| Stock | Cure Time in Mins. | Modulus of Elasticity in lbs./in.² at Elongation of 300% | Ultimate Tensile, lbs./in.² | Ultimate Elongation, percent |
| --- | --- | --- | --- | --- |
| A | 90 | 3,093 | 4,170 | 406 |
| B | 90 | 2,970 | 3,775 | 390 |
| C | 90 | 2,070 | 4,306 | 563 |
| D | 90 | 1,913 | 4,020 | 550 |
| E | 90 | 2,506 | 4,510 | 506 |
| F | 90 | 2,350 | 4,400 | 535 |

To demonstrate further the utility and improved properties of the new compositions of this invention as compared to certain well-known synthetic rubber vulcanization accelerators, the following rubber tire carcass stocks are compounded in the usual manner:

| Stock | G | H | I |
|---|---|---|---|
| Butadiene-styrene copolymer (GR-S) parts by weight | 75 | 75 | 75 |
| Whole tire reclaim do | 50 | 50 | 50 |
| Non retarding resin acid softener do | 4 | 4 | 4 |
| Reinforcing furnace black do | 30 | 30 | 30 |
| Petroleum hydrocarbon softener do | 5 | 5 | 5 |
| Zinc oxide do | 3 | 3 | 3 |
| Diphenylamine-acetone condensation product do | 1 | 1 | 1 |
| Sulfur do | 2.5 | 2.5 | 2.5 |
| Butylaldehyde-aniline do | 0.5 | 0.5 | 0.5 |
| 2-Mercaptobenzothiazole do | 1.2 | | |
| N-Cyclohexyl-2-benzothiazole sulfenamide do | | 1.2 | |
| Product of Example 1 do | | | 1.2 |

The processing safety of the respective compounded uncured stocks was determined by heating at 250° F. and measuring the plasticity by means of a Mooney plastometer employing the large rotor. The scorch time for the respective stocks was found to be 8 minutes (stock G), 20 minutes (stock H) and 21 minutes (stock I).

These scorch data demonstrate that the new compositions of this invention are substantially equivalent in processing safety to the well-known arylenethiazole sulfenamide type vulcanization accelerators in a typical synthetic rubber stock and much superior to mercaptobenzothiazole.

To demonstrate further the utility and particularly the powerful vulcanizing properties of the new compositions of this invention the following rubber tire tread stocks are compounded:

| Stock | K | L |
|---|---|---|
| Smoked sheets rubber parts by weight | 100 | 100 |
| Zinc oxide do | 5 | 5 |
| Stearic acid do | 2 | 2 |
| Saturated hydrocarbon oil softener do | 3 | 3 |
| Reinforcing furnace black do | 50 | 50 |
| p-Amino biphenyl-acetone reaction product do | 1.5 | 1.5 |
| Sulfur do | 2.5 | |
| N-Cyclohexyl-2-benzothiazole sulfenamide do | 0.5 | |
| Product of Example 1 do | | 3.0 |

The stocks so compounded are vulcanized by heating in a press for different periods of time at 282° F. The physical properties of the respective vulcanizates are set forth below:

Table II

| Stock | Cure Time in Mins. | Modulus of Elasticity in lbs./in.² at Elongations of— | | Ult. Tensile, lbs./in.² | Ult. Elong., Percent |
|---|---|---|---|---|---|
| | | 300% | 500% | | |
| K | 15 | 1,960 | 3,870 | 4,170 | 555 |
| L | 15 | 950 | 2,180 | 2,600 | 585 |
| K | 30 | 2,250 | 4,130 | 4,130 | 500 |
| L | 30 | 1,900 | 3,880 | 4,280 | 555 |
| K | 45 | 2,100 | 3,915 | 3,915 | 500 |
| L | 45 | 2,040 | 3,920 | 4,250 | 550 |
| K | 60 | 2,090 | 4,050 | 4,050 | 500 |
| L | 60 | 2,080 | 4,060 | 4,480 | 560 |

These data show that the presence of a composition of this invention is sufficient to produce an excellent cure.

The scorch time of stocks K and L determined by heating said unvulcanized compounded stocks at 250° F. and measuring their plasticity by means of a Mooney plastometer employing the large rotor was found to be 17 minutes and 27 minutes, respectively.

As further examples stocks were compounded comprising

| Stock | M | N |
|---|---|---|
| Smoked sheets rubber parts by weight | 100 | 100 |
| Reinforcing furnace black do | 50 | 50 |
| Saturated hydrocarbon oil softener do | 3 | 3 |
| Zinc oxide do | 5 | 5 |
| Stearic acid do | 2 | 2 |
| p-Amino biphenyl-acetone condensation product do | 1.5 | 1.5 |
| Product of Example 2 do | 2.5 | |
| Sulfur do | | 0.25 |
| 2,2'-Dithio-bis-(benzothiazole) do | | 1.31 |
| 4,4'-Dithio dimorpholine do | | 0.93 |

The scorch time at 275° F. was determined by means of a Mooney plastometer as hereinbefore described and also the modulus, tensile and cut-growth properties after curing 30 minutes at 288° F. The cut-growth was determined at 100° C. on an India flexing machine. The samples were punctured with a pointed instrument and kilocycles to failure recorded.

Table III

| Stock | Scorch Time, Mins. | Modulus of Elasticity, lbs./in.² at Elongation of 300% | Ultimate Tensile, lbs./in.² | Ultimate Elongation, percent | Cut-Growth, kc. to Failure |
|---|---|---|---|---|---|
| M | 9 | 2,276 | 4,273 | 526 | 375 |
| N | 7 | 1,885 | 4,230 | 580 | 250 |

Although it was possible to isolate from the fusion product of Example 3 some of the thiazyl sulfide unchanged, indicating that if a chemical combination took place on fusion it was a weak one, nevertheless, the product retarded scorch as compared to the separate components and was also a very efficient vulcanizing agent and accelerator. Rubber stocks were compounded comprising

| Stock | P | R |
|---|---|---|
| Smoked sheets rubber Parts by weight | 100 | 100 |
| Reinforcing furnace black do | 50 | 50 |
| Saturated hydrocarbon oil softener do | 10 | 10 |
| Zinc oxide do | 5 | 5 |
| Stearic acid do | 2 | 2 |
| p-Amino biphenyl-acetone condensation product do | 1.5 | 1.5 |
| Product of Example 3 do | 2.5 | |
| 2,2'-Dithio-bis-(benzothiazole) do | | 1.3 |
| N,N'-Dithio-bis-(β-isopropylaminopropionitrile) do | | 1.2 |

Mooney scorch at 175° F. was determined as described above and the modulus and tensile properties after curing by heating in the usual manner in a press for 30 minutes at 288° F.

Table IV

| Stock | Scorch Time, Mins. | Modulus of Elasticity, lbs./in.² at Elongation of 500% | Ultimate Tensile, lbs./in.² | Ultimate Elongation, percent |
|---|---|---|---|---|
| P | 16 | 2,040 | 2,833 | 600 |
| R | 14 | 1,870 | 2,520 | 640 |

The new compositions of this invention are useful in the vulcanization of other sulfur-vulcanizable rubbers than the aforedescribed, for example, balata, gutta percha, butadiene-1,3 polymers, copolymers of butadiene-1,3 with acrylonitrile, copolymers of butadiene-1,3 with styrene, and the like.

Although the amount of the new compositions employed in the vulcanization of rubber will depend upon the particular rubber, whether the composition is to function as a vulcanization accelerator or curative, other compounding ingredients, the purpose of the rubber compounder, and the like, a range of 0.5 to 10% based upon the rubber will produce a satisfactory vulcanizate. Generally, however, 1 to 3% on the rubber is preferred.

What is claimed is:

1. The composition consisting essentially of a homogeneous composite fused mixture of substantially equimolecular proportions of a 2,2′-dithiobisthiazole and an N,N′-dithio secondary amine, the secondary amine radicals being selected from the group consisting of heterocyclic amino radicals and aliphatic amino radicals in which the substituents are selected from alkyl groups, substituted alkyl groups, alicyclic groups, aralkyl groups and mixtures thereof.

2. The process of vulcanizing a sulfur-vulcanizable rubber which comprises heating the rubber in the presence of the composition of claim 1.

3. The vulcanized rubber product obtained according to the process of claim 2.

4. The composition consisting essentially of a homogeneous composite fused mixture of substantially equimolecular proportions of a 2,2′-dithiobis(arylenethiazole) and an N,N′-dithio secondary amine, the secondary amine radicals being selected from the group consisting of heterocyclic amino radicals and aliphatic amino radicals in which the substituents are selected from alkyl groups, substituted alkyl groups, alicyclic groups, aralkyl groups and mixtures thereof.

5. The process of vulcanizing a sulfur-vulcanizable rubber containing a reinforcing furnace black which comprises heating the rubber and black in the presence of the composition of claim 4.

6. The vulcanized rubber product obtained according to the process of claim 5.

7. The composition consisting essentially of a homogeneous composite fused mixture of substantially equimolecular proportions of 2,2′-dithiobis(benzothiazole) and an N,N′-dithio secondary amine of the structure

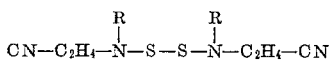

where R is an aliphatic hydrocarbon radical of less than nine carbon atoms.

8. The process of vulcanizing a sulfur-vulcanizable rubber containing a reinforcing furnace black which comprises heating the rubber and said black in the presence of the composition of claim 7.

9. The vulcanized product obtained according to the process of claim 8.

10. The composition consisting essentially of a homogeneous composite fused mixture of substantially equimolecular proportions of 2,2′-dithiobis(benzothiazole) and an N,N′-dithio secondary amine of the structure

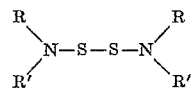

where R and R′ are alkyl groups containing not more than twelve carbon atoms.

11. The process of vulcanizing a sulfur-vulcanizable rubber containing a reinforcing furnace black which comprises heating the rubber and said black in the presence of the composition of claim 10.

12. The vulcanized product obtained according to the process of claim 11.

13. The ether insoluble homogeneous composite fused mixture of substantially equimolecular proportions of 2,2′-dithiobis(benzothiazole) and N,N′-dithiobis(morpholine).

14. The process of vulcanizing a sulfur-vulcanizable rubber which comprises heating the rubber in the presence of the composition of claim 13.

15. The process of vulcanizing india rubber containing a reinforcing furnace black which comprises heating the rubber and said black in the presence of the composition of claim 13.

16. The vulcanized product obtained according to the process of claim 15.

References Cited in the file of this patent

UNITED STATES PATENTS

| | | |
|---|---|---|
| 1,990,963 | Teppema | Feb. 12, 1935 |
| 2,045,888 | Tschunkar et al. | June 30, 1936 |
| 2,167,385 | Harman | July 25, 1939 |
| 2,271,123 | Jones | Jan. 27, 1942 |
| 2,271,834 | Carr | Feb. 3, 1942 |
| 2,273,322 | Jones | Feb. 17, 1942 |
| 2,343,524 | Blake | Mar. 7, 1944 |
| 2,419,283 | Paul et al. | Apr. 22, 1947 |
| 2,419,294 | Skaptason | Apr. 22, 1947 |
| 2,610,967 | Kleiman | Sept. 16, 1952 |